(12) United States Patent
Cornolti et al.

(10) Patent No.: US 6,651,785 B2
(45) Date of Patent: Nov. 25, 2003

(54) ARTICULATED PAD FOR DISC BRAKES

(75) Inventors: Raffaello Cornolti, Sorisole (IT); Aristide Veneziano, Lallio (IT)

(73) Assignee: Freni Brembo S.p.A., Bergamo (IT)

( * ) Notice: Subject to any disclaimer, the term of this patent is extended or adjusted under 35 U.S.C. 154(b) by 0 days.

(21) Appl. No.: 10/148,501

(22) PCT Filed: Dec. 15, 2000

(86) PCT No.: PCT/EP00/12825

§ 371 (c)(1),
(2), (4) Date: May 28, 2002

(87) PCT Pub. No.: WO01/50034

PCT Pub. Date: Jul. 12, 2001

(65) Prior Publication Data

US 2002/0170788 A1 Nov. 21, 2002

(30) Foreign Application Priority Data

Dec. 30, 1999 (EP) .............................................. 99830820

(51) Int. Cl.⁷ .............................................. F16D 65/00
(52) U.S. Cl. ............... 188/73.1; 188/250 B; 188/250 G
(58) Field of Search ................................ 188/73.1, 71.5, 188/72.4, 72.5, 72.6, 73.2, 217, 250 B, 250 G, 250 E, 259, 257, 258; 192/107 R

(56) References Cited

U.S. PATENT DOCUMENTS

| | | | | |
|---|---|---|---|---|
| 3,602,328 A | * | 8/1971 | Fannin et al. | 188/72.5 |
| 5,477,944 A | | 12/1995 | Bryan et al. | 188/72.5 |
| 5,620,063 A | * | 4/1997 | Smith | 188/73.2 |
| 5,934,418 A | * | 8/1999 | Wirth | 188/73.1 |

FOREIGN PATENT DOCUMENTS

| | | |
|---|---|---|
| DE | 2982113 | 2/1999 |
| GB | 2049078 A * | 12/1980 |

* cited by examiner

*Primary Examiner*—Pam Rodriguez
(74) *Attorney, Agent, or Firm*—Sofer & Haroun, LLP

(57) ABSTRACT

Articulated pad for disc brakes comprising two or more brake shoes securely attached together by of a hinge joint which permits relative movement of the two brake shoes in the direction of the axis of the hinge, located perpendicular to the contact surfaces between the brake shoes and a brake disc.

6 Claims, 1 Drawing Sheet

ARTICULATED PAD FOR DISC BRAKES

BACKGROUND OF THE INVENTION

This invention relates to an articulated pad for disc brakes comprising at least two pieces which are hinged together.

Pads for disc brakes comprising several independent parts which are distributed circumferentially about the periphery of the brake disk, adjacent to each other, are known. In comparison with monoblock pads, these pads have the advantage that they ensure more uniform wear and a longer service life, despite a reduction in braking efficiency.

Nevertheless, these pads have some disadvantages in that once they have been fitted to the brake shoes the pads are interlocked with each other by curvilinear sections joined by their adjacent sides, and these consist of separate parts before assembly, that is it makes them difficult to fit, and it is first of all necessary to have the various parts in their correct relative positions and then insert them together into the appropriate housing in the brake shoe, where they are retained by a securing plate.

A further disadvantage in comparison with monoblock pads lies in the greater overall play resulting from machining tolerances relative to the dimensions of the housing.

Because braking operations are intermittent and the relative position of the parts can be considered random before any braking action, although within the limits of the permitted play, during the course of braking the forces acting tend to force the parts to adopt a predetermined relative contact position with the matched curvilinear sections, causing appreciable wear of the matching profiles in areas of relatively large slip, with an increase in play which results in relative radial displacement between these parts with reference to the axis of rotation of the disc.

This gives rise to greater wear of the pad friction material in the radially peripheral strips, with some reduction in braking efficiency, appreciable noise and, ultimately, a reduction in the operating safety of the braking system.

SUMMARY OF THE INVENTION

The problem underlying this invention is that of devising an articulated pad for disc brakes which has structural and functional characteristics which will overcome the above-mentioned disadvantages in comparison with the articulated pads in the known art.

This problem is overcome by an articulated pad for disc brakes in accordance with the present invention.

This invention overcomes these problems and offers articulated pads in a plurality of parts, preferably but not necessarily two, articulated together with a hinge link which permits a certain amount of relative movement by the parts in the direction of the axis of the hinge, perpendicular to the plane of the disc brake, while permanently attaching them to each other so that installation is made very much easier.

In addition to this the hinge link limits the possibilities for radial displacement of the two parts in relation to the axis of the disc, permitting a certain amount of relative movement between the parts in the plane of the disc in a direction perpendicular to the radial direction so that the matching surfaces of the two adjacent parts can come into contact, although with play, and discharge the stresses induced by braking from one to the other without causing significant relative sliding between the stressed parts, with consequent wear, and without the links being subjected to significant stresses.

BRIEF DESCRIPTION OF THE DRAWINGS

The features and advantages of the invention will be more apparent from the following description with reference to the appended drawings in which.

DESCRIPTION OF THE PREFERRED EMBODIMENTS

Figure 1:
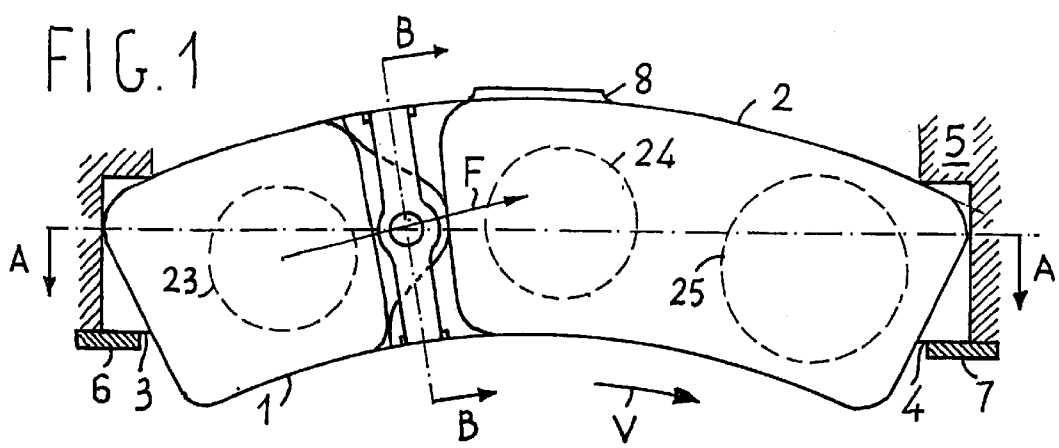
FIG. 1 is a front view, that is from the side facing the disc brake, of a preferred embodiment of an articulated pad according to this invention.
Figure 2:
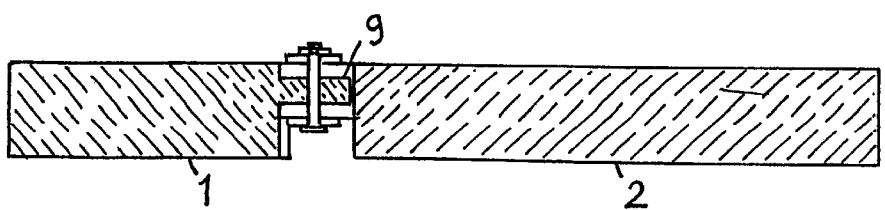
FIG. 2 is a view of the pad in FIG. 1 along the cross-section A—A in FIG. 1.

With reference to FIG. 1 the articulated pad according to this invention comprises two braking plates or shoes 1 and 2 of fibre, which may or may not necessarily be combined with a backing support in the form of a metal plate, and generically shaped as the sectors of a circular ring of different length. Brake shoes 1 and 2, when fitted, face a sector of the braking surface of a braking disc, not shown, and come into contact with this through the effect of the thrust exerted by hydraulic pistons (represented by dashed lines in FIG. 1 and indicated by 23, 24 and 25) acting on the rear surface of the pad, in a direction X—X perpendicular to the plane of the drawing.

Brake shoes 1 and 2, which are adjacent, have two tenons (indicated by 3 and 4 respectively in FIG. 1) at opposite ends, which are lower than the surfaces of brake shoes 1 and 2 which are intended to come into contact with the surface of the disc in order to exert the braking effect.

The tenons are inserted in housings in the body 5 of the brake, and are free to move in a direction X—X perpendicular to the plane of the disc (the plane of the illustration in FIG. 1) and are retained there by securing plates 6 and 7.

Brake shoe 2 also has a shoulder 8, again recessed with respect to the surface of brake shoes 1 and 2, which rests on a contact surface of the brake body and acts together with tenons 3 and 4 in order to position the pad correctly.

In the area where they are adjacent, the two brake shoes 1 and 2 are joined together along a joined curvilinear profile, which is preferably but not necessarily sinusoidal, which is in any event free from discontinuities or notches, which, as is known, are the cause of significant local internal stresses and consequent fracture through the effect of imposed stresses.

Brake shoe 1 has a projection 9, corresponding to the foot of the wave of sinusoidal profile, which engages the wave-shaped recess formed between the solid parts of two half-wave teeth 10 and 11 of brake shoe 2. Teeth 10 and 11 are conveniently lower than the surface of brake shoes 1 and 2, with a thickness S1 for example of the order of 10–12 mm, in comparison with a greater thickness of brake shoes 1 and 2, for example of the order of 20–21 mm.

Projection 9 also has a smaller thickness S2, for example of the order of 6–8 mm, with surfaces which are lower than the surface of the brake shoe which is in contact with the braking surface of the disc, and lower than the opposite surface.

Figure 3:
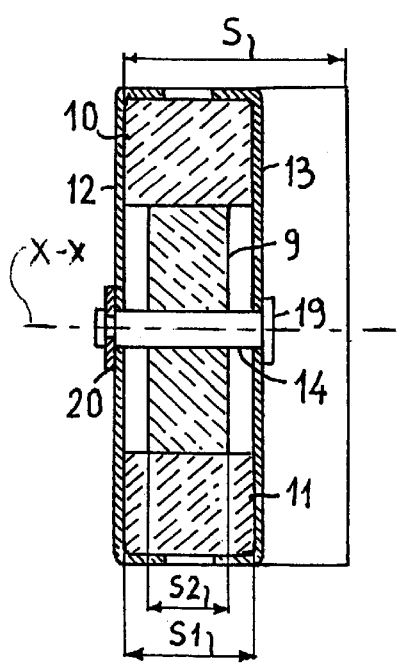
FIG. 3 is an enlarged view of the pad articulation along the cross-section B—B in FIG. 1.

These features are clearly shown in FIG. 3, an enlarged view along the cross-section B—B in FIG. 1.

Figure 4:
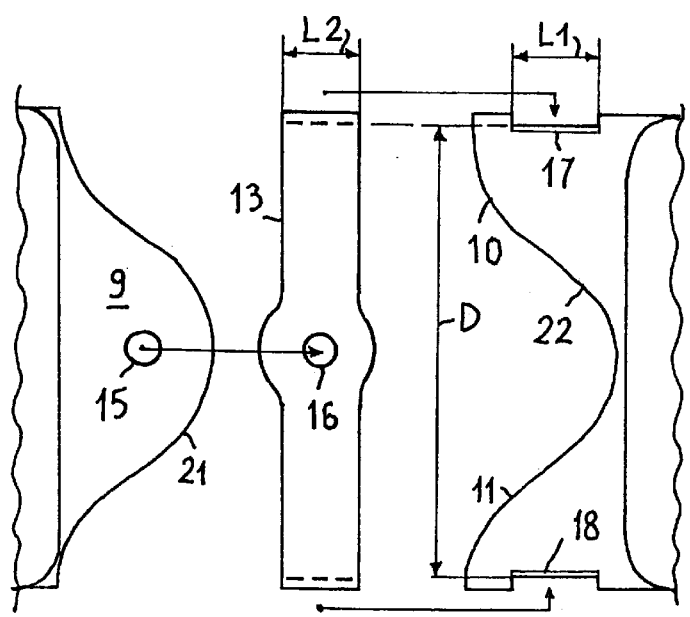
FIG. 4 is an exploded and enlarged front view (that is of the side facing the disc brake) of construction details constituting the articulation for the pad in FIG. 1.

The two brake shoes 1 and 2 are linked together by means of a hinge joint comprising two metal yoke pieces 12 and 13 and a pin 14 passing through the yokes and projection 9, as more clearly shown in FIGS. 3 and 4. For this purpose both projection 9 and yokes 12 and 13 have corresponding holes, 15 and 16 respectively, to permit the passage of pin 14.

The two yokes 12 and 13 have their ends bent into a right angle so as to engage in two grooves 17 and 18 made in the opposite outer surfaces respectively of the two teeth 10 and 11.

In order to hold the two yokes 12 and 13 in position, pin 14 is provided with a terminal head 19, and, at the opposite end, an annular recess for housing a securing spring clip 20, such as e.g. a Benzing or Seeger ring.

It is obvious that an articulation constructed in this way will act more as a socket joint, or rather a slide (as will be clarified below) than as a hinge. In fact the relative rotation between the two brake shoes about pin 14 is small, and only that permitted by the play of the different components, given that the interference between matching profiles 21 and 22, that is between projection 9 and teeth 10 and 11, prevents further rotation.

Conversely relatively extensive relative movement of the two brake shoes is permitted in the direction of pin 14, that is in the direction X—X perpendicular to the plane of the disc brake, as a result of the small thickness S2 of the projection in comparison with the distance between the yokes 12 and 13 which corresponds to the thickness S1 of teeth 10 and 11.

In this way the braking effect of the two brake shoes 1 and 2 is decoupled and completely independent of any possible differential wear phenomena in the two brake shoes 1 and 2.

Another aspect of the dynamic system created in this way can now be considered: while the diameter of holes 15 and 16 is dimensioned with relative accuracy in order to house pin 14, grooves 17 and 18 have a width L1 which is conveniently greater than the width L2 of yokes 12 and 13.

For example L1 may have a nominal value of 8 mm and L2 may have a nominal value of 7 mm. On the other hand distance D (FIG. 4) between the bases of the two grooves is conveniently equal to the distance between the bent-back ends of yokes 12 and 13.

This permits a certain amount of relative positioning play between the two brake shoes 1 and 2 in a tangential direction (by tangential is meant the direction in which the brake disc is displaced in its sector which is angularly in line with the mechanism), so that the two brake shoes 1 and 2 can come into contact through their matching profiles 20 and 21 without the occurrence of stresses at the link, while on the other hand relative movements in a radial direction are prevented by the accurate fit between pin 14 and holes 15 and 16, and between the bases of grooves 17 and 18 and the ends of yokes 12 and 13.

Tangential alignment of the two brake shoes is essential in order to ensure that significant forces develop on brake shoe 1 through the effect of the braking action (or brake shoe 2, depending on the direction in which the disc rotates), which, taking up the inevitable positioning play, forces the two matching profiles 21 and 22 into contact, the contact being established without slip (or with minimum slip) between the profiles.

If the direction of rotation of the brake disc, under normal conditions of forward movement, is that shown by arrow V (FIG. 1), it is obvious that when braking brake shoe 1 will be stressed by a considerable friction force F and that only a minimum part of this friction force will be absorbed by hydraulic piston 23. Therefore almost all the stress on brake shoe 1 will be discharged onto brake shoe 2. This will take up the positioning play between brake shoe 1 and 2, which are in contact along the above mentioned matching profile.

In turn brake shoe 2 can discharge the imposed stresses onto the body of the brake through links 4 and 8.

The significant contact pressures involved would result in rapid wear of the flanks of projection 9 and teeth 10 and 11 if there was any tangential misalignment.

This problem does not arise, or is wholly negligible, because of the relative slip between the ends of yokes 12 and 13 and the bases of the grooves, slip which takes place substantially in the direction of force F (FIG. 1), therefore without the development of significant contact pressures.

As can be appreciated from what has been described above, the articulated pad for disc brakes according to the invention eliminates the problems mentioned in connection with the pads of the known art.

A further advantage of the articulated pad for disc brakes according to the invention, lies in its unusual structural and functional simplicity, which therefore makes it cheap to produce and assemble, and ensures that it operates correctly throughout its service life.

Clearly the above description refers to a preferred embodiment and many variants may be made without going beyond the scope of the invention.

For example, the permitted play between the bent-back ends of yokes 12 and 13 and the sides of grooves 17 and 18 may be replaced by suitable play obtained by shaping hole 15 in projection 9 or holes 16 in yokes 12 and 13 as eye-holes elongated in a tangential direction.

Then, instead of being substantially straight in a radial direction, the yokes could be slightly angled, with the consequence that the amplitude of the wave in the matching profiles could be reduced.

Although in the preferred embodiment the articulated pad is formed from two brake shoes, it is also possible to envisage articulated pads with more than two brake shoes, for example three, hinged in pairs with the same arrangements as described.

What is claimed is:

1. An articulated pad for a brake disc, comprising at least two independent brake shoes, wherein the at least two brake shoes are permanently attached together by means of a hinge articulation having an hinge axis, which permits relative displacement of the at least two brake shoes in the direction of the axis of the hinge, said axis being located perpendicular to the contact surfaces between the two brake shoes and the brake disc.

2. Articulated pad according to claim 1, in which the said hinge joint permits further relative movement of the two brake shoes, substantially only in the direction of the force which is produced by the braking action on a brake shoe, the said force pressing the brake shoe into contact with the other along a matching curvilinear profile.

3. Articulated pad according to claim 1 or 2 in which the said hinge joint comprises a projection which is incorporated into one of the brake shoes, a pair of teeth which are incorporated into the other of the brake shoes, a pair of yokes which engage the said teeth with bent-back ends housed in two grooves formed in the said teeth and a pin fitted in a hole in the said yokes and the said projection respectively, located between the said yokes, so that the said projection engages a recess between the said pair of teeth, the thickness of the said projection being less than the thickness of the said teeth and the distance between the said yokes.

4. Articulated pad according to claim 3, in which the bent-back ends of the said yokes have play within the said grooves substantially only in the direction of the said force and the said pin is fitted into said hole substantially without play.

5. Articulated pad according to claim 3, in which said hole in the said yokes are shaped as an eye which is extended only in the direction of the said force to permit the said pin to move in the said direction with respect to said hole.

6. Articulated pad according to claim 3, in which the hole in the said projection is shaped as an eye which is extended in only the direction of the said force to permit the said pin to move in the said direction with respect to said hole.

* * * * *